United States Patent
Takahashi

(10) Patent No.: US 9,726,276 B2
(45) Date of Patent: Aug. 8, 2017

(54) MIXER DRUM DRIVING APPARATUS INCLUDING A PLURALITY OF MOTORS CONFIGURED TO DRIVE AN AUXILIARY FLUID PRESSURE PUMP TO ROTATE

(71) Applicant: KAYABA INDUSTRY CO., LTD., Tokyo (JP)

(72) Inventor: Yoshimitsu Takahashi, Saitama (JP)

(73) Assignee: KYB Corporation, Tokyo (JP)

(*) Notice: Subject to any disclaimer, the term of this patent is extended or adjusted under 35 U.S.C. 154(b) by 308 days.

(21) Appl. No.: 14/386,280

(22) PCT Filed: Feb. 26, 2013

(86) PCT No.: PCT/JP2013/054957
§ 371 (c)(1),
(2) Date: Sep. 18, 2014

(87) PCT Pub. No.: WO2013/140960
PCT Pub. Date: Sep. 26, 2013

(65) Prior Publication Data
US 2015/0047335 A1 Feb. 19, 2015

(30) Foreign Application Priority Data
Mar. 22, 2012 (JP) ................................. 2012-065745

(51) Int. Cl.
*B28C 5/42* (2006.01)
*F16H 61/00* (2006.01)
(Continued)

(52) U.S. Cl.
CPC ......... *F16H 61/0031* (2013.01); *B28C 5/085* (2013.01); *B28C 5/422* (2013.01);
(Continued)

(58) Field of Classification Search
CPC ......... B28C 5/42; B28C 5/4203; B28C 5/421; B28C 5/4213; B28C 5/1856;
(Continued)

(56) References Cited

U.S. PATENT DOCUMENTS 3,053,044 A * 9/1962 Gresty .................. B28C 5/4213
60/486
3,333,415 A * 8/1967 Adams .................. B60K 17/10
251/51

(Continued)

FOREIGN PATENT DOCUMENTS

| CN | 202012199 U | 10/2011 |
|---|---|---|
| CN | 102275223 A | 12/2011 |

(Continued)

OTHER PUBLICATIONS

Harry L. Stewart: "Hydraulic and Pneumatic Power for Production: How Air and Oil Equipment Can . . . —Harry L. Stewart—Google Livres", Jan. 1, 1977 (Jan. 1, 1977) Retrieved from the Internet: URL:https:/fbooks.google.nl/books?id=FHzwcgh2gjQC &dq=two+motors+for+one+pump&hl=fr&source=gbs_navlinks_s[retrieved on Nov. 9, 2015] pp. 27-11, paragraph 6.

(Continued)

*Primary Examiner* — Charles Cooley
(74) *Attorney, Agent, or Firm* — Rabin & Berdo, P.C.

(57) ABSTRACT

A mixer drum driving apparatus includes an auxiliary fluid pressure pump that is provided independently of a fluid pressure pump and is capable of supplying a working fluid to a fluid pressure motor so as to cause a mixer drum to perform agitation rotation, a plurality of motors configured to drive the auxiliary fluid pressure pump to rotate, and a control unit that controls rotation of the mixer drum. When an engine is stopped during the agitation rotation of the mixer drum, the control unit drives the auxiliary fluid (Continued)

pressure pump to rotate by operating the plurality of motors selectively in accordance with a load of the mixer drum.

9 Claims, 8 Drawing Sheets

(51) Int. Cl.
- *F16H 61/4139* (2010.01)
- *F15B 11/17* (2006.01)
- *F16H 61/4148* (2010.01)
- *B28C 5/08* (2006.01)
- *F16H 61/444* (2010.01)
- *F15B 7/00* (2006.01)

(52) U.S. Cl.
CPC ............ *B28C 5/4213* (2013.01); *F15B 11/17* (2013.01); *F16H 61/4139* (2013.01); *F16H 61/4148* (2013.01); *F16H 61/444* (2013.01); *F15B 7/006* (2013.01); *F15B 2211/20515* (2013.01); *F15B 2211/20523* (2013.01); *F15B 2211/20538* (2013.01); *F15B 2211/20576* (2013.01); *F15B 2211/2658* (2013.01); *F15B 2211/30525* (2013.01); *F15B 2211/327* (2013.01); *F15B 2211/41581* (2013.01); *F15B 2211/426* (2013.01); *F15B 2211/61* (2013.01); *F15B 2211/633* (2013.01); *F15B 2211/6309* (2013.01); *F15B 2211/6346* (2013.01); *F15B 2211/6651* (2013.01); *F15B 2211/7058* (2013.01); *F15B 2211/88* (2013.01)

(58) Field of Classification Search
CPC ....... B28C 5/4217; B28C 5/422; B28C 5/085; B60P 3/16; F16H 61/0031; F16H 61/444; F16H 61/4148; F16H 61/4139; F15B 11/17; F15B 2211/61; F15B 2211/327; F15B 2211/20523; F15B 7/006; F15B 2211/2658; F15B 2211/20576; F15B 2211/6346; F15B 2211/41581; F15B 2211/7058; F15B 2211/88; F15B 2211/633; F15B 2211/20515; F15B 2211/426; F15B 2211/6309; F15B 2211/30525; F15B 2211/20538; F15B 2211/6651
USPC ...................................... 366/53–63, 232–233
See application file for complete search history.

(56) References Cited

U.S. PATENT DOCUMENTS

| | | | | |
|---|---|---|---|---|
| 3,391,537 A * | 7/1968 | Smith, Jr. | ............ | B28C 5/4213 60/422 |
| 3,603,084 A * | 9/1971 | Okazaki | ................ | B28C 5/4213 60/389 |
| 5,746,509 A * | 5/1998 | Gebhard | ................ | B28C 5/421 366/61 |
| 6,074,083 A * | 6/2000 | Gebhard | ............ | F16H 61/4165 366/61 |
| 7,467,889 B2 * | 12/2008 | Abe | ....................... | B28C 5/4213 366/61 |
| 7,866,875 B2 * | 1/2011 | Abe | ....................... | B28C 5/4213 366/61 |
| 8,104,947 B2 * | 1/2012 | Ando | .................... | B28C 5/4213 366/54 |
| 8,616,758 B2 * | 12/2013 | Takahashi | ............ | B28C 5/4213 366/61 |
| 8,926,164 B2 * | 1/2015 | Kamijo | .................. | B28C 5/422 366/61 |
| 9,346,186 B2 * | 5/2016 | Takahashi | ............ | B28C 5/4213 |
| 9,409,313 B2 * | 8/2016 | Shimizu | .................. | B28C 5/422 |
| 9,481,106 B2 * | 11/2016 | Takahashi | ............ | B28C 5/4213 |
| 2003/0132729 A1 | 7/2003 | Yoshimatsu | | |
| 2007/0280035 A1 * | 12/2007 | Abe | ....................... | B28C 5/4213 366/31 |
| 2008/0008025 A1 * | 1/2008 | Abe | ....................... | B28C 5/4213 366/61 |
| 2008/0134674 A1 * | 6/2008 | Geissler | .................. | F16H 61/40 60/464 |
| 2009/0282824 A1 * | 11/2009 | Ando | .................... | B28C 5/4213 60/449 |
| 2013/0021867 A1 * | 1/2013 | Shimizu | .................. | B28C 5/422 366/40 |
| 2013/0111892 A1 * | 5/2013 | Takahashi | ............ | B28C 5/4213 60/459 |
| 2013/0276577 A1 * | 10/2013 | Kroschel | ............... | B28C 5/4213 74/665 B |
| 2014/0010036 A1 * | 1/2014 | Takahashi | ............ | B28C 5/4213 366/61 |
| 2014/0013736 A1 * | 1/2014 | Takahashi | ............ | B28C 5/4213 60/428 |
| 2014/0015315 A1 * | 1/2014 | Takahashi | ............ | B28C 5/4213 307/10.1 |
| 2014/0198599 A1 * | 7/2014 | Kamijo | .................. | B28C 5/422 366/61 |
| 2015/0047335 A1 * | 2/2015 | Takahashi | ........... | F16H 61/4139 60/428 |
| 2015/0217481 A1 * | 8/2015 | Takahashi | ............ | B28C 5/4213 366/61 |
| 2016/0250774 A1 * | 9/2016 | Takahashi | ............... | F02D 29/04 |

FOREIGN PATENT DOCUMENTS

| | | | | |
|---|---|---|---|---|
| DE | 3539550 A1 * | 6/1986 | ............ | B28C 5/422 |
| JP | 50-98122 A | 8/1975 | | |
| JP | 59-001642 U | 1/1984 | | |
| JP | 03-084263 A | 4/1991 | | |
| JP | 09-165789 A | 6/1997 | | |
| JP | 2001-329573 A | 11/2001 | | |
| JP | 2003-220884 A | 8/2003 | | |
| JP | 2003-232304 A | 8/2003 | | |
| JP | 2003-294008 A | 10/2003 | | |
| JP | 2003-301802 A | 10/2003 | | |
| JP | 2006-272591 A | 10/2006 | | |
| JP | 2007-278430 A | 10/2007 | | |

OTHER PUBLICATIONS

Japanese Office Action dated Jun. 30, 2015.

* cited by examiner

MIXER DRUM DRIVING APPARATUS INCLUDING A PLURALITY OF MOTORS CONFIGURED TO DRIVE AN AUXILIARY FLUID PRESSURE PUMP TO ROTATE

TECHNICAL FIELD

The present invention relates to a mixer drum driving apparatus.

BACKGROUND ART

A concrete mixer truck is a vehicle that carries fresh concrete in a mixer drum and transports the fresh concrete from a fresh concrete factory to a construction site. To prevent the fresh concrete in the concrete mixer truck from decreasing in quality and hardening, the mixer drum is rotated normally so that the fresh concrete is agitated by a plurality of spiral blades provided in the mixer drum. Further, the concrete mixer truck is configured such that the fresh concrete in the mixer drum can be discharged by rotating the mixer drum in reverse. When the concrete mixer truck arrives at a concrete pouring site, the mixer drum is rotated in reverse so that the fresh concrete is supplied to a pouring location.

In this type of concrete mixer truck, the mixer drum must be rotated constantly until the fresh concrete is discharged. An engine of the concrete mixer truck is typically used as a drive source for driving the mixer drum. More specifically, by transmitting power from the engine to a hydraulic pump via a PTO (Power Take Off) and driving the hydraulic motor using working oil discharged from the hydraulic pump, the mixer drum can be driven to rotate by the hydraulic motor.

In a mixer drum driving apparatus that drives a mixer drum using only power from an engine, as described above, an engine rotation speed must be increased when the mixer drum is to be rotated at high speed. When the engine rotation speed is increased, noise is generated from the engine, and an increase in fuel consumption occurs. Further, when fresh concrete is carried in the mixer drum, the mixer drum must be rotated constantly to prevent hardening and the like. Therefore, the engine of the concrete mixer truck cannot be stopped even when the truck is stationary while waiting its turn to discharge the fresh concrete at a pouring site. As a mixer drum driving apparatus for solving these problems, JP2007-278430A discloses a mixer drum driving apparatus that drives a mixer drum to rotate by driving an auxiliary hydraulic pump using a motor while a concrete mixer truck is stationary, instead of driving a hydraulic pump using an engine.

However, the mixer drum driving apparatus disclosed in JP2007-278430A exhibits the following problems.

In this mixer drum driving apparatus, while the concrete mixer truck is stationary, all mixer drum driving, i.e. driving for the purposes of agitating, introducing, and discharging fresh concrete, are executed via the motor. Therefore, a high output motor must be used, leading to an increase in the size of the motor and a power supply. When the motor, the power supply, and related components required to drive the motor increase in size, the concrete mixer truck increases in weight.

An object of the present invention is to provide a mixer drum driving apparatus in which a motor and a power supply can be reduced in size.

According to an aspect of the present invention, a mixer drum driving apparatus has a mixer drum carried on a frame of a concrete mixer truck to be free to rotate, a fluid pressure motor that drives the mixer drum to rotate, and a fluid pressure pump that is driven by power from an engine of the concrete mixer truck in order to supply a working fluid to the fluid pressure motor. The mixer drum driving apparatus includes an auxiliary fluid pressure pump that is provided independently of the fluid pressure pump and is capable of supplying the working fluid to the fluid pressure motor so as to cause the mixer drum to perform agitation rotation, a plurality of motors configured to drive the auxiliary fluid pressure pump to rotate, and a control unit that controls rotation of the mixer drum. When the engine is stopped during the agitation rotation of the mixer drum, the control unit drives the auxiliary fluid pressure pump to rotate by operating the plurality of motors selectively in accordance with a load of the mixer drum.

Embodiments and advantages of the present invention will be described in detail below with reference to the attached figures.

DESCRIPTION OF EMBODIMENTS

A mixer drum driving apparatus according to a first embodiment of the present invention will now be described with reference to FIGS. 1 to 7.

Figure 2:
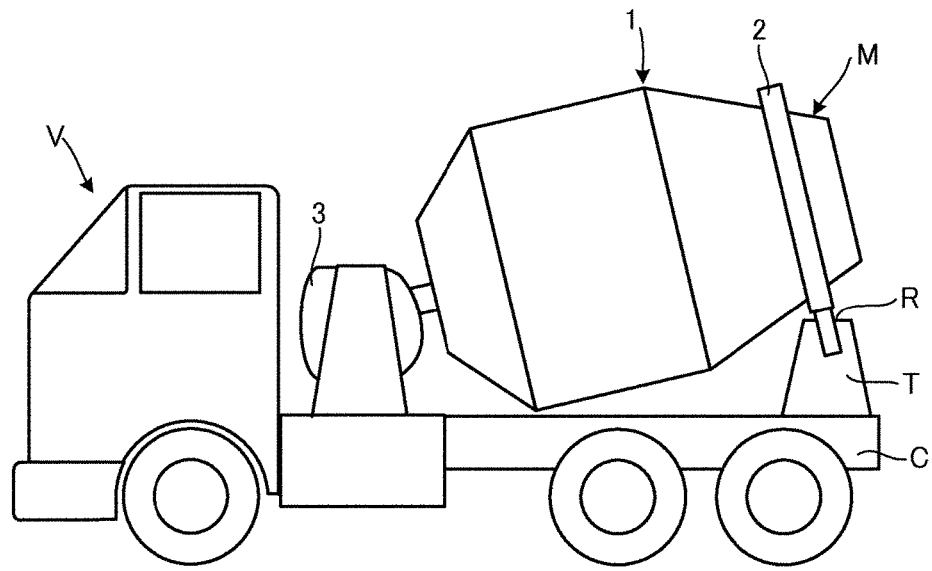
FIG. 2 is a left side view of a concrete mixer truck carrying a mixer drum on a frame.
Figure 3:
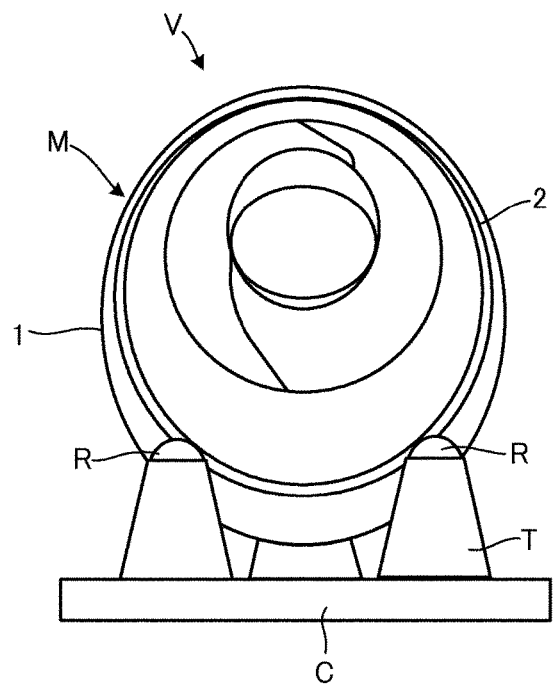
FIG. 3 is a back view of the mixer drum of the concrete mixer truck.

As shown in FIGS. 2 and 3, a concrete mixer truck V is a vehicle that transports fresh concrete introduced into a mixer drum M in a fresh concrete factory to a pouring site. After the fresh concrete is discharged at the pouring site, washing water is introduced into the mixer drum M, whereupon the concrete mixer truck returns to the fresh concrete factory while the inside of the mixer drum M is washed.

The mixer drum M includes a roller ring 2 on a rear end side outer periphery thereof. The roller ring 2 is supported from a lower side by a pair of rollers R, R provided on a tip end of a bracket T of a frame C to be free to rotate. A front end axial center portion of the mixer drum M is connected to a hydraulic motor 3. The mixer drum M is thus disposed on the frame C to be free to rotate in a forward tilting attitude in which the rear end side is raised upward. The mixer drum M is constituted by a closed end cylinder-shaped drum shell 1 having an open rear end.

A plurality of spiral blades, not shown in the figures, are provided on an inner peripheral surface of the drum shell 1. When the hydraulic motor 3 rotates so as to rotate the mixer drum M normally, the blades agitate the fresh concrete in the mixer drum M while moving the fresh concrete toward a front side. When the hydraulic motor 3 rotates so as to rotate the mixer drum M in reverse, on the other hand, the blades move the fresh concrete toward the rear side. By rotating the mixer drum M in reverse in this manner, the fresh concrete can be discharged from the mixer drum M. It should be noted that when fresh concrete is introduced into the mixer drum M, the mixer drum M is rotated normally by the hydraulic motor 3 at a higher speed than during agitation rotation.

Hence, the mixer drum M is rotated in three modes, namely an introduction mode M1 used to introduce fresh concrete, an agitating mode M2 used to agitate the fresh concrete, and a discharge mode M3 used to discharge the fresh concrete. In the agitating mode M2, the mixer drum M is rotated normally at a low enough speed to prevent the fresh concrete from hardening, thereby suppressing an increase in a slump value of the fresh concrete while preventing hardening thereof. It should be noted that a stopping mode M4 for stopping the rotation of the mixer drum M may be added to the three modes described above.

Figure 1:
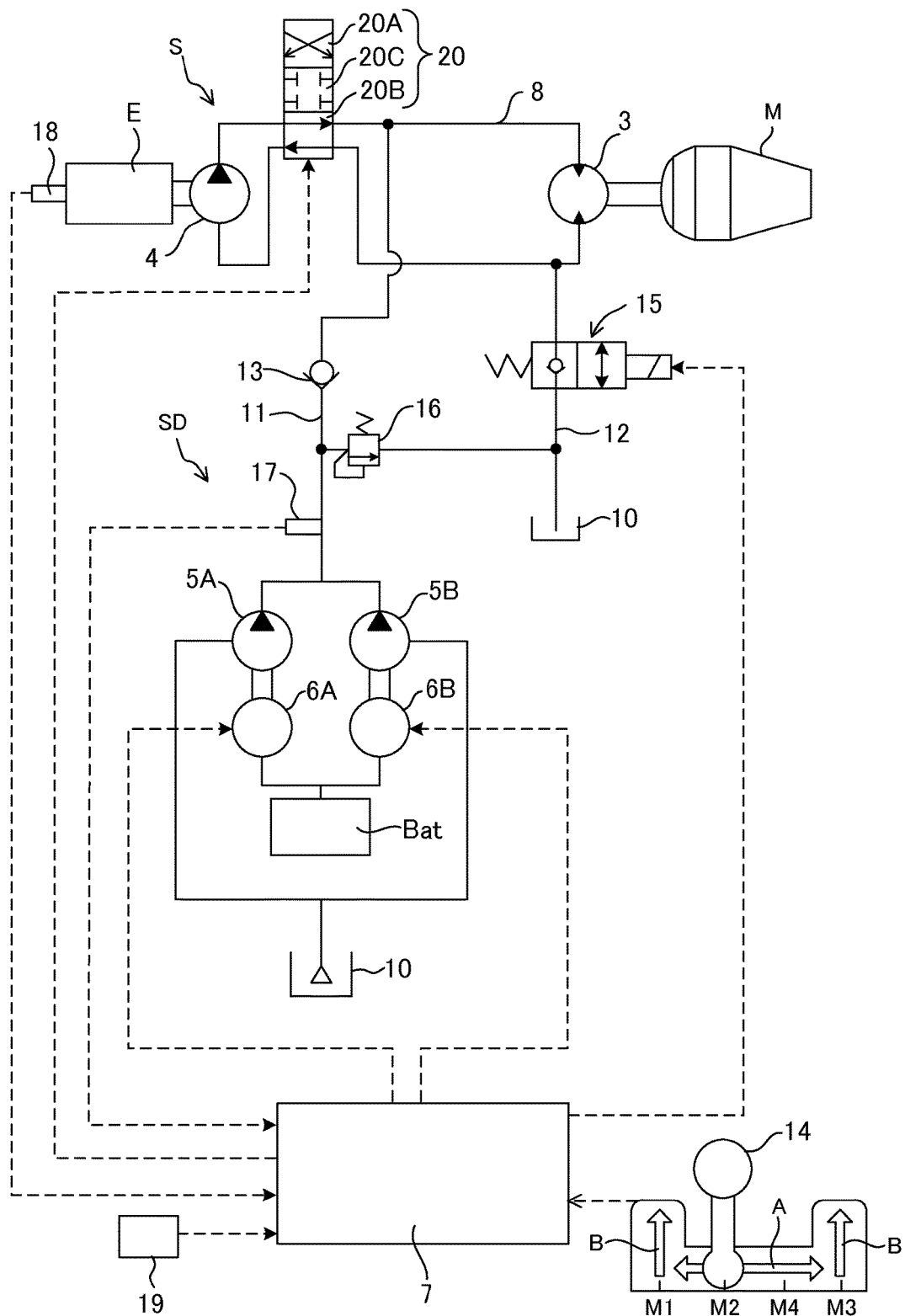
FIG. 1 is a schematic view showing a configuration of a mixer drum driving apparatus according to a first embodiment of the present invention.

As shown in FIG. 1, the concrete mixer truck V includes a mixer drum driving apparatus S that drives the mixer drum M. The mixer drum driving apparatus S includes the mixer drum M, which is carried on the frame C of the concrete mixer truck V to be free to rotate, the hydraulic motor 3 (a fluid pressure motor) that drives the mixer drum M to rotate, a hydraulic pump 4 (a fluid pressure pump) that is driven by power from an engine E of the concrete mixer truck V to supply working oil (a working fluid) to the hydraulic motor 3, and a controller 7 (a control unit). A reduction gear may be interposed between the hydraulic motor 3 and the mixer drum M.

The mixer drum driving apparatus S includes an auxiliary hydraulic apparatus SD having two auxiliary hydraulic pumps 5A, 5B (auxiliary fluid pressure pumps) provided independently of the hydraulic pump 4 to be capable of supplying working oil to the hydraulic motor 3 and two direct current motors 6A, 6B that drive the auxiliary hydraulic pumps 5A, 5B to rotate. The mixer drum M, the hydraulic motor 3, the hydraulic pump 4, the auxiliary hydraulic apparatus SD, and the controller 7 are carried on the frame C of the concrete mixer truck V.

The hydraulic pump 4 and the hydraulic motor 3 are connected by a loop-shaped pipe 8. The hydraulic pump 4 is a variable capacity piston pump, for example, that discharges working oil toward the hydraulic motor 3. The hydraulic pump 4 is driven to rotate by power from the engine E of the concrete mixer truck V via a PTO or the like.

The hydraulic pump 4 discharges the working oil in a single direction, and therefore a switch valve 20 that switches a flow direction of the working oil is provided midway in the loop-shaped pipe 8 to switch the hydraulic motor 3 between normal rotation and reverse rotation. The switch valve 20 is a direction switching valve having four ports and three positions. The switch valve 20 includes a normal rotation position 20B in which the working oil is transmitted to the hydraulic motor 3 so as to cause the hydraulic motor 3 to rotate normally, a reverse rotation position 20A in which the working oil is transmitted to the hydraulic motor 3 so as to cause the hydraulic motor 3 to rotate in reverse, and a neutral position 20C in which the hydraulic motor 3 is disconnected from the hydraulic pump 4.

It should be noted that a bidirectional discharge pump capable of modifying the working oil discharge direction may be employed as the hydraulic pump 4. In this case, the hydraulic pump 4 and the hydraulic motor 3 are connected by the loop-shaped pipe 8, and the hydraulic motor 3 is caused to rotate normally or in reverse by switching the discharge direction of the hydraulic pump 4. A switch valve having a connecting position for connecting the loop-shaped pipe 8 and a disconnecting position for disconnecting the hydraulic motor 3 from the hydraulic pump 4 is used as the switch valve 20. When the bidirectional discharge type hydraulic pump 4 is a variable capacity piston pump, the loop-shaped pipe 8 can be disconnected from the hydraulic pump 4 by adjusting a tilt angle thereof such that a discharge amount of the hydraulic pump 4 is set at zero. In this case, therefore, the switch valve 20 having the disconnecting position may be omitted. When the loop-shaped pipe 8 is disconnected from the hydraulic pump 4, working oil discharged from the auxiliary hydraulic pumps 5, to be described below, does not leak from the hydraulic pump 4, and therefore all of the working oil can be supplied to the hydraulic motor 3.

The mixer drum driving apparatus S shown in FIG. 1 is provided with a selection lever 14 with which an operator of the concrete mixer truck V can select the rotation mode of the mixer drum M. By having the operator operate the selection lever 14, the mixer drum M can be rotated in the selected rotation mode.

By operating the selection lever 14 in the direction of an arrow A in the figure, the operator can select any one of the introduction mode M1 for rotating the mixer drum M normally at high speed, the agitating mode M2 for rotating the mixer drum M normally at low speed, the discharge mode M3 for rotating the mixer drum M in reverse at high speed, and the stopping mode M4 for stopping the mixer drum M. When the agitating mode M2 is selected by the selection lever 14, an adjustment mechanism, not shown in the figures, that automatically adjusts the tilt angle of the hydraulic pump 4 is activated such that a discharge flow of the hydraulic pump 4 is adjusted to a constant flow regardless of a rotation speed of the engine E. As a result, the mixer drum M rotates normally at a constant speed regardless of the rotation speed of the engine E.

The selection lever 14 is connected to a governor, not shown in the figures, of the engine E via a link or the like. When the selection lever 14 is operated in the direction of an arrow B in the figure in a condition where either the introduction mode M1 or the discharge mode M3 is selected, the rotation speed of the engine E is increased, leading to an increase in the working oil discharge amount discharged from the hydraulic pump 4, and as a result, the rotation speed of the mixer drum M can be increased.

The rotation mode of the mixer drum M, selected by the selection lever 14, is detected by a detection switch, not shown in the figures, and a detection signal from the detection switch is input into the controller 7. On the basis of the detection signal output from the detection switch, the controller 7 controls an operation of an actuator or the like that switches the switch valve 20. In the introduction mode M1 and the agitating mode M2, the switch valve 20 is switched to the normal rotation position 20B, and in the discharge mode M3, the switch valve 20 is switched to the reverse rotation position 20A. In the stopping mode M4, the switch valve 20 is set in the neutral position 20C.

As described above, the mixer drum driving apparatus S includes the auxiliary hydraulic apparatus SD that is capable of supplying working oil to the hydraulic motor 3 independently on the hydraulic pump 4. The auxiliary hydraulic apparatus SD includes a supply pipe 11 that is connected to the loop-shaped pipe 8 so as to supply working oil from the hydraulic pump 4 to the hydraulic motor 3 when the hydraulic motor 3 is rotated normally, and a discharge pipe 12 that is connected to the loop-shaped pipe 8 so as to return the working oil from the hydraulic motor 3 to the hydraulic pump 4 when the hydraulic motor 3 is rotated normally.

The auxiliary hydraulic pumps 5A, 5B driven by the direct current motors 6A, 6B are disposed in the supply pipe 11 in parallel. Further, a check valve 13 that prevents backflow of the working oil from the loop-shaped pipe 8 side is disposed in the supply pipe 11. The check valve 13 is disposed in the supply pipe 11 on a downstream side of the auxiliary hydraulic pumps 5A, 5B. The check valve 13 allows the working oil to flow only from the auxiliary hydraulic pumps 5A, 5B to the loop-shaped pipe 8. Meanwhile, an opening/closing valve 15 that opens and closes the discharge pipe 12 is provided in the discharge pipe 12. A relief valve 16 for preventing a pressure in the supply pipe 11 from reaching or exceeding a set value is provided in a connecting passage that connects the supply pipe 11 to the discharge pipe 12.

When the mixer drum M is rotated by the engine E, the check valve 13 in the supply pipe 11 and the opening/closing valve 15 in the discharge pipe 12 block the respective pipes 11, 12. As a result, the working oil circulating through the loop-shaped pipe 8 does not flow into the supply pipe 11 and the discharge pipe 12, and therefore the loop-shaped pipe 8 is maintained as a closed circuit.

The two auxiliary hydraulic pumps 5A, 5B are configured to be driven by the direct current motors 6A, 6B, respectively. The direct current motors 6A, 6B are connected to a power supply Bat so as to rotate in only one direction. Power from the power supply Bat is supplied to the direct current motors 6A, 6B on the basis of a motor drive command output from the controller 7, and when the direct current motors 6A, 6B are driven, the corresponding auxiliary hydraulic pump 5A, 5B rotates. Accordingly, the auxiliary hydraulic pumps 5A, 5B suction working oil from a tank 10 and discharge the working oil into the supply pipe 11. The working oil discharged from the auxiliary hydraulic pumps 5A, 5B is supplied to the loop-shaped pipe 8 via the check valve 13 in the supply pipe 11, whereby the hydraulic motor 3 is caused to rotate normally. At this time, the opening/closing valve 15 in the discharge pipe 12 is opened on the basis of an opening command output by the controller 7. Accordingly, the hydraulic motor 3 is rotated normally such that the working oil discharged from the hydraulic motor 3 is returned to the tank 10 through the discharge pipe 12. A pressure of the working oil in the supply passage 11 is detected by a pressure sensor (a pressure switch) 17, and a detection signal from the pressure sensor 17 is input into the controller 7.

A detection signal output from a rotation speed sensor 18 that detects the engine rotation speed, a rotation mode signal indicating the rotation mode of the mixer drum M selected by the selection lever 14, the pressure signal output from the pressure sensor 17 in the supply pipe 11, and a key switch signal output from a key switch 19 of an ignition key are input into the controller 7. On the basis of these signals, the controller 7 determines the rotation mode of the mixer drum M and a rotation condition of the engine E. Having determined that the rotation mode of the mixer drum M is the agitating mode and the engine E is stopped, the controller 7 drives one of the direct current motors 6A, 6B using power from the power supply Bat. At this time, the controller 7 switches the switch valve 20 to the neutral position 20C, and switches the opening/closing valve 15 to an open position.

Further, having determined that one of the direct current motors 6A, 6B is being driven by the power supply Bat and the pressure of the working oil in the supply pipe 11, detected by the pressure sensor 17, has exceeded a predetermined value, the controller 7 drives the plurality of direct current motors 6A, 6B using the power supply Bat. Furthermore, when the stopped engine E is restarted, the controller 7 sets the opening/closing valve 15 in the discharge pipe 12 in a blocked condition, stops all of the direct current motors 6A, 6B, and switches the switch valve 20 in the loop-shaped pipe 8 to the normal rotation position 20A.

Figure 4:
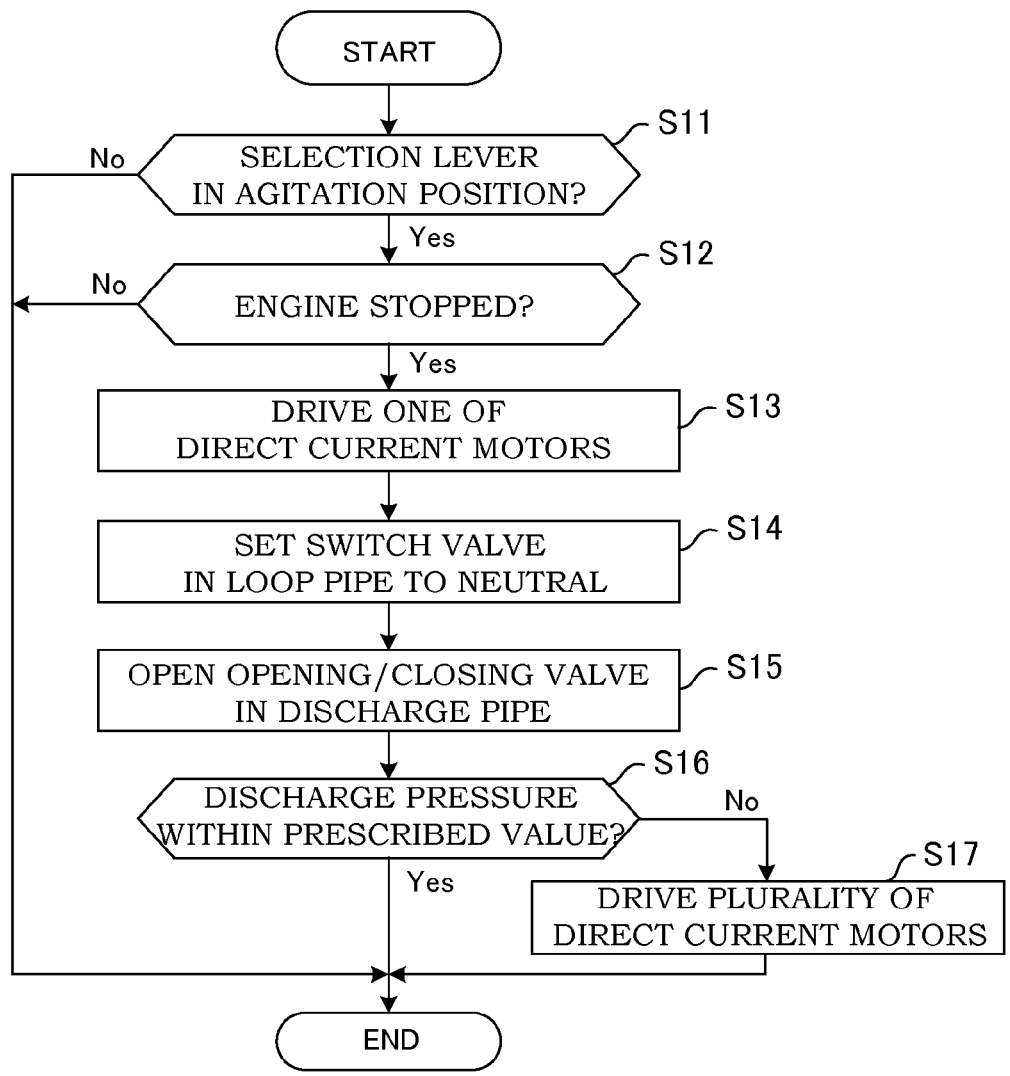
FIG. 4 is a flowchart showing operation control processing executed on an auxiliary hydraulic apparatus by a controller carried on the concrete mixer truck.

FIG. 4 is a flowchart showing operation control processing executed by the controller 7 on the auxiliary hydraulic apparatus SD. The operation control processing of the auxiliary hydraulic apparatus SD is activated when the key switch 19 of the ignition key passes a midway accessory position while being switched from an ON position, in which the engine E is rotated, to an OFF position, and executed periodically thereafter.

When the concrete mixer truck V carrying fresh concrete arrives at a pouring site while the mixer drum M rotates, the concrete mixer truck V stops at the pouring site, but the operation of the engine E is continued in order to continue agitating the fresh concrete in the mixer drum M. In other words, the working oil discharged from the hydraulic pump 4 driven by the engine E is supplied to the hydraulic motor 3 via one side of the loop-shaped pipe 8, and the working oil discharged from the hydraulic motor 3 is returned to the hydraulic pump 4 via another side of the loop-shaped pipe 8. At this time, the supply pipe 11 and the discharge pipe 12 are closed by the check valve 13 and the opening/closing valve 15, and therefore the working oil discharged from the hydraulic pump 4 circulates through the loop-shaped pipe 8 without flowing out into the tank 10.

While the concrete mixer truck V waits at the pouring site in this condition, the operator of the concrete mixer truck V switches the key switch 19 of the ignition key from the ON position to the OFF position. When the ignition key passes the accessory position while being switched from the ON position to the OFF position, the operation control processing of the auxiliary hydraulic apparatus SD, shown in FIG. 4, is executed.

In a step S11, the controller 7 determines whether or not the rotation mode of the mixer drum M is the agitating mode. In a step S12, the controller 7 determines whether or not the engine E is stopped. The rotation mode of the mixer drum M is determined in accordance with the selection position of the selection lever 14, and whether or not the engine E is stopped is determined from the rotation signal output by the engine rotation speed sensor 18. Whether or not the engine E is stopped may also be determined on the basis of at least one of an engine rotation pulse signal and an idling stop signal.

When the rotation mode of the mixer drum M is not the agitating mode or the engine E is not stopped, the controller 7 terminates the control processing. When, on the other hand, the rotation mode of the mixer drum M is the agitating mode and the engine E is stopped, the controller 7 executes processing of a step S13.

In the step S13, the controller 7 drives one of the two direct current motors 6A, 6B using the power supply Bat. Next, in a step S14, the controller 7 switches the switch valve 20 in the loop-shaped pipe 8 to the neutral position 20C corresponding to a blocked condition. Next, in a step S15, the controller 7 switches the opening/closing valve 15 in the discharge pipe 12 to an open condition.

As a result of the processing of the steps S13 to S15, one of the direct current motors 6A, 6B rotates such that the corresponding auxiliary hydraulic pump 5A, 5B is driven to discharge working oil into the supply pipe 11. When the engine E is stopped, the switch valve 20 is switched to the neutral position 20C, and therefore the stopped hydraulic pump 4 is disconnected from the loop-shaped pipe 8. By disconnecting the hydraulic pump 4 in this manner, the working oil discharged from one of the auxiliary hydraulic pumps 5A, 5B can be prevented from flowing to the hydraulic pump 4 side. As a result, the mixer drum M can be rotated efficiently without causing a loss of pressure in the working oil.

The working oil discharged from one of the auxiliary hydraulic pumps 5A, 5B is supplied to the hydraulic motor 3 through one side of the loop-shaped pipe 8, which is disconnected from the hydraulic pump 4 by the switch valve 20, so that the hydraulic motor 3 is rotated continuously by this working oil instead of the hydraulic pump 4 driven by the engine E. The working oil discharged from the hydraulic motor 3 is led into the discharge pipe 12 through the other side of the loop-shaped pipe 8 and discharged into the tank 10 through the open opening/closing valve 15. In other words, an auxiliary hydraulic circuit constituted by the auxiliary hydraulic pumps 5A, 5B in the supply pipe 11—the check valve 13—one side of the loop-shaped pipe 8—the hydraulic motor 3—the other side of the loop-shaped pipe 8—the opening/closing valve 15 in the discharge pipe 12—the tank 10—the auxiliary hydraulic pumps 5A, 5B in the supply pipe 11 is formed.

In a step S16, the controller 7 determines whether or not the pressure of the working oil in the supply pipe 11 (a discharge pressure of the working oil discharged from one of the auxiliary hydraulic pumps 5A, 5B), detected by the pressure sensor 17, is within a predetermined value. When the pressure of the working oil in the supply pipe 11 is within the predetermined value, the controller 7 terminates the control processing. When the pressure of the working oil in the supply pipe 11 exceeds the predetermined value, on the other hand, the controller 7 executes processing of a step S17, and after executing the processing of the step S17, terminates the control processing.

Figure 6:
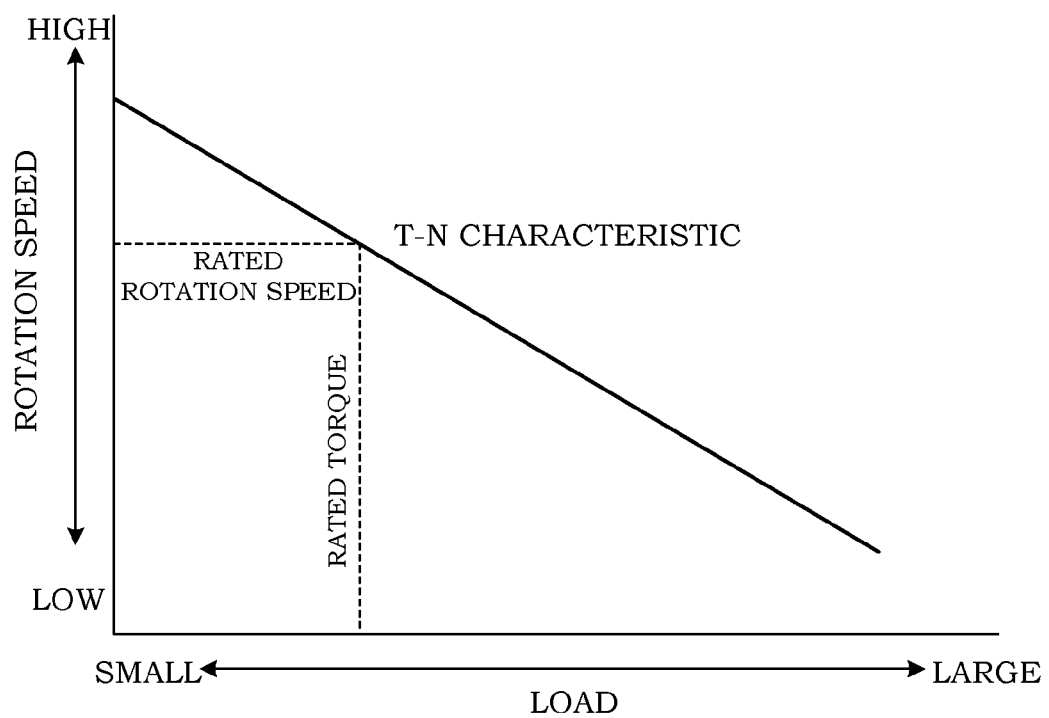
FIG. 6 is a view showing a rotation speed characteristic of a direct current motor.

As shown in FIG. 6, the direct current motors 6A, 6B have a characteristic whereby a rotation speed thereof varies in accordance with a load torque. In other words, the direct current motors 6A, 6B have a T-N characteristic according to which the rotation speed is high when the load torque is small, and the rotation speed decreases as the load torque increases. Therefore, when the working oil discharge pressure of the auxiliary hydraulic pumps 5A, 5B, which constitutes the load of the direct current motors 6A, 6B, increases, the rotation speed of the direct current motors 6A, 6B decreases, leading to a reduction in a discharge amount per unit time of the auxiliary hydraulic pumps 5A, 5B. The working oil discharge pressure of the auxiliary hydraulic pumps 5A, 5B increases in accordance with in a rotation resistance of the mixer drum M, or in other words a reduction in the slump value indicating a fluidity of the fresh concrete. When the slump value of the fresh concrete in the mixer drum M is low, the rotation resistance of the mixer drum M increases, and therefore the pressure of the working oil supplied to the hydraulic motor 3 also increases. When the slump value of the fresh concrete in the mixer drum M is high, on the other hand, the rotation resistance of the mixer drum M decreases, and therefore the pressure of the working oil supplied to the hydraulic motor 3 also decreases.

In the step S16 of FIG. 4, when the detected pressure of the working oil in the supply pipe 11, or in other words the discharge pressure of the working oil discharged from one of the auxiliary hydraulic pumps 5A, 5B, is determined to be within the predetermined value, this indicates a condition in which the rotation resistance of the mixer drum M, corresponding to the slump value of the fresh concrete, is comparatively low, and therefore the rotation speed of the driven auxiliary hydraulic pump 5A or 5B and the rotation speed of the hydraulic motor 3 are being maintained at a predetermined agitation rotation speed. In other words, as shown in FIG. 7, this means that the agitation rotation speed of the mixer drum M can be secured sufficiently by one of the direct current motors 6A, 6B.

However, when the detected pressure of the working oil in the supply pipe 11, or in other words the discharge pressure of the working oil discharged from one of the auxiliary hydraulic pumps 5A, 5B, exceeds the predetermined value, this means that the rotation resistance of the mixer drum M, corresponding to the slump value of the fresh concrete, is comparatively high, and therefore the rotation speed of the driven auxiliary hydraulic pump 5A or 5B and the rotation speed of the hydraulic motor 3 have decreased below the predetermined agitation rotation speed.

Figure 7:
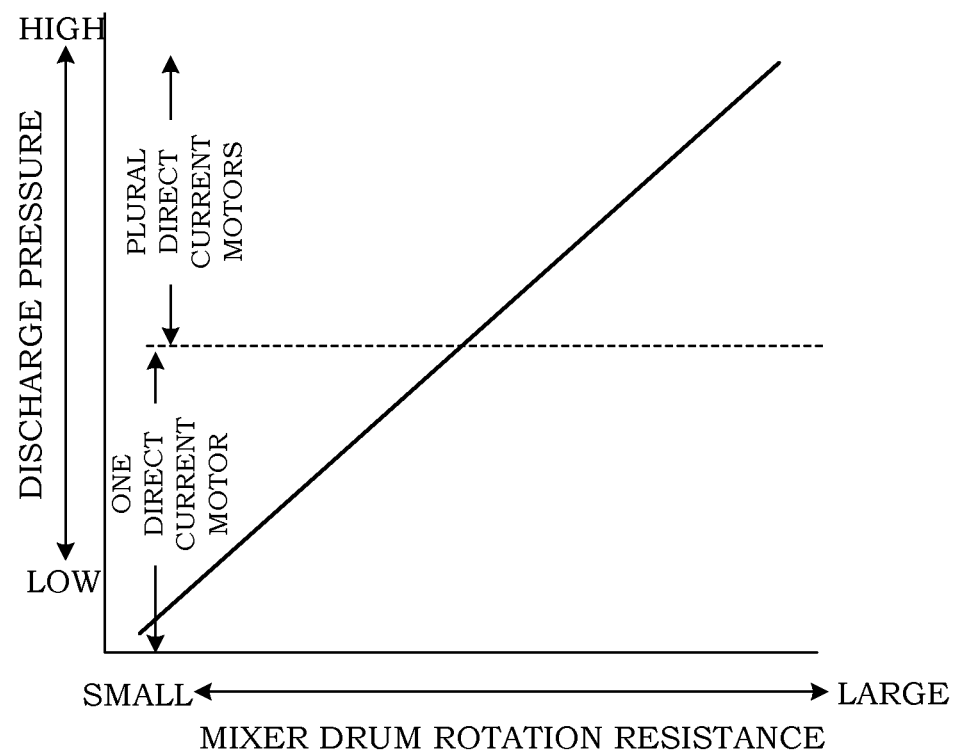
FIG. 7 is a view showing a discharge pressure characteristic of the direct current motor.

In a step S17, therefore, as shown in FIG. 7, the controller 7 drives the two direct current motors 6A, 6B such that the flow of the working oil is increased by the two auxiliary hydraulic motors 5A, 5B, and as a result, the rotation speed of the hydraulic motor 3 is increased to the predetermined agitation rotation speed. When the two auxiliary hydraulic pumps 5A, 5B have an identical capacity, the flow of the working oil supplied to the hydraulic motor 3 is twice the working oil flow supplied by the auxiliary hydraulic pumps 5A, 5B individually.

It should be noted that the capacities of the plurality of auxiliary hydraulic pumps 5A, 5B and rated outputs of the direct current motors 6A, 6B do not necessarily have to be identical, and may be different. When the capacities of the plurality of auxiliary hydraulic pumps 5A, 5B and the rated outputs of the direct current motors 6A, 6B are different, the discharge flow of the working oil can be adjusted in accordance with respective combinations thereof. In so doing, the agitation rotation speed of the mixer drum M can be maintained within a predetermined rotation speed range even when the rotation resistance of the mixer drum M varies.

Figure 5:
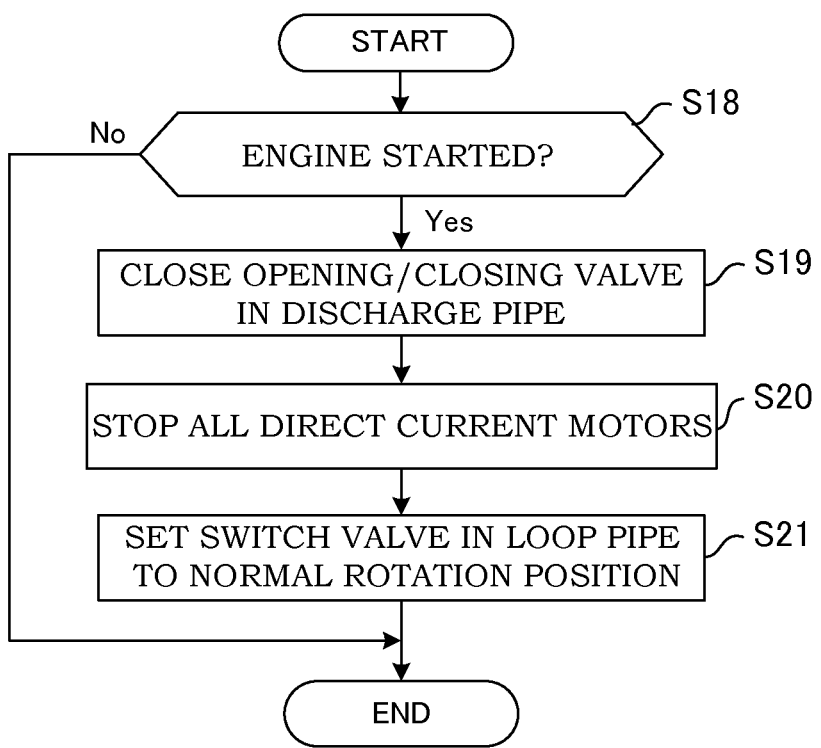
FIG. 5 is a flowchart showing operation control processing executed by the controller on the auxiliary hydraulic apparatus during engine restarting.

Referring to FIG. 5, operation control processing executed by the controller 7 when the engine is restarted will be described. When the engine E is restarted in a condition where the mixer drum M is being rotated by working oil supplied from the auxiliary hydraulic apparatus SD, the controller 7 executes the operation control processing performed upon engine restarting, shown in FIG. 5, periodically from this point onward.

First, in a step S18, the controller 7 determines whether or not the engine E has been restarted. This determination is made on the basis of an output value of the engine rotation speed sensor 18. When the engine E has not been restarted, the controller 7 terminates the control processing, and agitation rotation of the mixer drum M by the auxiliary hydraulic apparatus SD is continued. When the engine E has been restarted, on the other hand, the controller 7 executes processing of steps S19 to S21 such that the hydraulic pump 4 is driven using the power of the engine E, with the result that the hydraulic motor 3 is driven by the hydraulic pump 4 instead of the auxiliary hydraulic pumps 5A, 5B. In other words, agitation rotation of the mixer drum M is performed by the auxiliary hydraulic apparatus SD from stopping to restarting of the engine E, and performed using the power of the engine E after the engine E is restarted.

In the step S19, the controller 7 switches the opening/closing valve 15 in the discharge pipe 12 from the open condition to the closed condition. Next, in a step S20, the controller 7 stops both of the direct current motors 6A, 6B by halting the power supply to the direct current motors 6A, 6B. Next, in a step S21, the controller 7 switches the switch valve 20 in the loop-shaped pipe 8 from the neutral position 20C (a blocked condition) to the normal rotation position 20A. As a result of this processing, the auxiliary hydraulic apparatus SD is disconnected from the loop-shaped pipe 8, and the hydraulic pump 4 is driven by the power of the engine E such that agitation rotation of the mixer drum M is restarted using the working oil discharged by the hydraulic pump 4. By disconnecting the auxiliary hydraulic pumps 5A, 5B of the auxiliary hydraulic apparatus SD from the hydraulic motor 3, the working oil discharged from the hydraulic pump 4 can be prevented from flowing out into the tank 10 through the auxiliary hydraulic pumps 5A, 5B.

Figure 8:
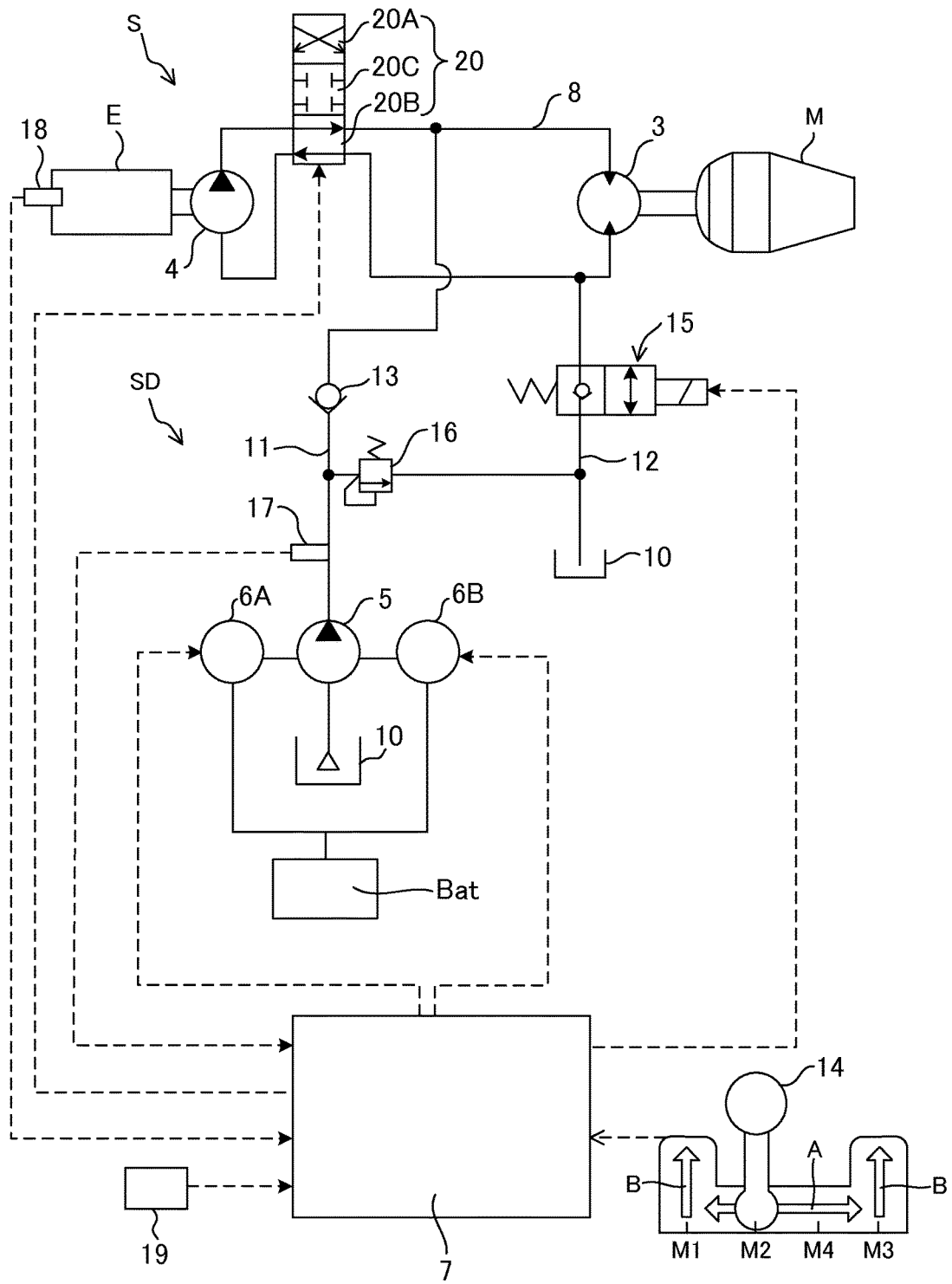
FIG. 8 is a schematic view showing a configuration of a mixer drum driving apparatus according to a second embodiment of the present invention.

Referring to FIG. 8, the mixer drum driving apparatus S according to a second embodiment of the present invention will be described.

In the mixer drum driving apparatus S according to the second embodiment, the configurations of the auxiliary hydraulic pumps 5A, 5B and the direct current motors 6A, 6B of the auxiliary hydraulic apparatus SD differ from the first embodiment.

The auxiliary hydraulic apparatus SD of the mixer drum driving apparatus S according to the second embodiment is configured such that a single auxiliary hydraulic pump 5 is driven by the two direct current motors 6A, 6B. When the pressure detected by the pressure sensor 17 (a working oil discharge pressure of the auxiliary hydraulic pump 5) is within a predetermined pressure, the controller 7 of the auxiliary hydraulic apparatus SD drives the auxiliary hydraulic pump 5 using one of the direct current motors 6A, 6B, whereby the hydraulic motor 3 is rotated at the predetermined agitation rotation speed.

However, when the pressure detected by the pressure sensor 17 (the working oil discharge pressure of the auxiliary hydraulic pump 5) exceeds the predetermined pressure, this means that the rotation resistance of the mixer drum M, corresponding to the slump value of the fresh concrete, is comparatively high, and therefore, if the auxiliary hydraulic pump 5 is driven using only one of the direct current motors 6A, 6B, the rotation speed of the hydraulic motor 3 decreases below the predetermined agitation rotation speed. Accordingly, the controller 7 drives both the direct current motors 6A, 6B in order to increase the rotation speed of the auxiliary hydraulic pump 5 such that the discharge flow of the working oil discharged from the auxiliary hydraulic pump 5 increases. As a result, the rotation speed of the hydraulic motor 3 can be increased to the predetermined agitation rotation speed.

In a case where the two direct current motors 6A, 6B have identical rated outputs, the flow of the working oil supplied to the hydraulic motor 3 when the auxiliary hydraulic pump 5 is driven using both direct current motors 6A, 6B is twice the flow obtained when the auxiliary hydraulic pump 5 is driven using one of the direct current motors 6A, 6B. It should be noted that motors having identical rated outputs do not have to be used as the direct current motors 6A, 6B. As long as a rated torque applied to the auxiliary hydraulic pump 5 can be adjusted within a range of an upper limit and a lower limit of the slump value of the fresh concrete agitated by the mixer drum M, a combination of direct current motors 6A, 6B having different rated outputs may be used.

Figure 9:
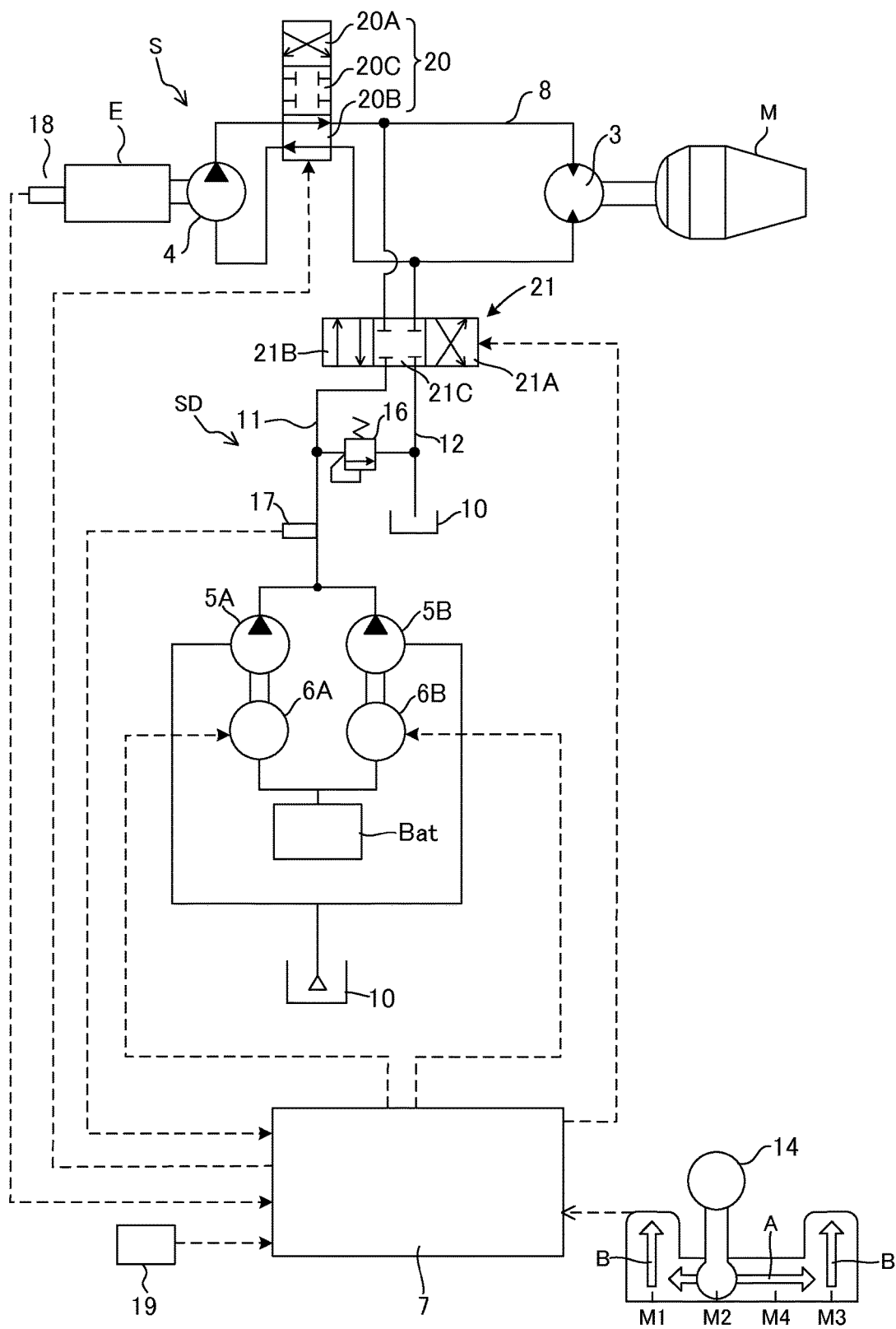
FIG. 9 is a schematic view showing a configuration of a mixer drum driving apparatus according to a third embodiment of the present invention.

Referring to FIG. 9, the mixer drum driving apparatus S according to a third embodiment of the present invention will be described.

The mixer drum driving apparatus S according to the third embodiment differs from the mixer drum driving apparatus according to the first embodiment in that a direction switching valve 21 is provided in the supply pipe 11 and the discharge pipe 12 of the auxiliary hydraulic apparatus SD in place of the check valve 13 and the opening/closing valve 15.

In the auxiliary hydraulic apparatus SD of the mixer drum driving apparatus S according to the third embodiment, the direction switching valve 21 is provided in the supply pipe 11 and the discharge pipe 12. The direction switching valve 21 includes a pair of ports that can be connected to the supply pipe 11 and the discharge pipe 12, and a pair of ports that can be connected to one side and the other side of the loop-shaped pipe 8. The direction switching valve 21 has a neutral position 21C in which all ports are blocked, a normal rotation position 21B in which the supply pipe 11 and the discharge pipe 12 are connected to the loop-shaped pipe 8 so as to cause the mixer drum M to rotate normally, and a reverse rotation position 21A in which the supply pipe 11 and the discharge pipe 12 are connected to the loop-shaped pipe 8 so as to cause the mixer drum M to rotate in reverse. The direction switching valve 21 is a control valve that controls a communication condition between the supply pipe 11 and the loop-shaped pipe 8 and a communication condition between the discharge pipe 12 and the loop-shaped pipe 8.

The direction switching valve 21 remains in the neutral position 21C until the engine E is stopped. When the engine E is stopped while the selection lever 14 is in the agitation position or the like, an actuator such as a solenoid, not shown in the figures, is driven by the controller 7 to switch the direction switching valve 21 away from the neutral position 21C.

When the engine E is stopped in the agitation mode or the introduction mode, the direction switching valve 21 is switched from the neutral position 21C to the normal rotation position 21B. As a result, the working oil discharged from one or both of the auxiliary hydraulic pumps 5A, 5B is supplied to the hydraulic motor 3 such that the mixer drum M rotates normally. When the engine E is stopped in the discharge mode, on the other hand, the direction switching valve 21 is switched from the neutral position 21C to the reverse rotation position 21A. As a result, the working oil discharged from one or both of the auxiliary hydraulic pumps 5A, 5B is supplied to the hydraulic motor 3 such that the mixer drum M rotates in reverse. When the selection lever 14 is operated to modify the rotation mode of the mixer drum M after the engine E has been stopped, the direction switching valve 21 is switched on the basis of the modified rotation mode.

In this embodiment, similarly to the first embodiment, while the engine E is stopped, the flow of the working oil supplied to the hydraulic motor 3 is secured by varying the number of operated direct current motors 6A, 6B on the basis of the pressure of the working oil in the supply pipe 11. In so doing, the mixer drum M can be rotated at a predetermined rotation speed.

When the rotation mode of the mixer drum M is modified to the stopping mode M4 while the engine is stopped, the direction switching valve 21 is switched to the neutral position 21C in order to stop the hydraulic motor 3, and simultaneously, the direct current motors 6A, 6B are stopped in order to stop the working oil supply.

Further, when the engine E is restarted from a stopped condition, the direction switching valve 21 is switched to the neutral position 21C regardless of the rotation mode of the mixer drum M selected by the selection lever 14, and simultaneously, the direct current motors 6A, 6B are stopped in order to stop the working oil supply. Accordingly, the drive source of the hydraulic motor 3 following restarting of the engine E is switched from the auxiliary hydraulic apparatus SD to the hydraulic pump 4 such that the hydraulic motor 3 is driven to rotate by the working oil discharged from the hydraulic pump 4.

In the mixer drum driving apparatus S according to the third embodiment, the rotation mode of the mixer drum M can be modified to the agitation mode, the introduction mode, the stopping mode, and the discharge mode even while the engine is stopped. Further, the mixer drum M can be rotated either normally or in reverse at a predetermined rotation speed.

Effects of the mixer drum driving apparatus S according to the first to third embodiments, described above, are summarized below.

In the first to third embodiments, when the engine E is stopped during agitation rotation of the mixer drum M, the plurality of direct current motors 6A, 6B are operated selectively in accordance with the load of the mixer drum M (the working oil pressure in the supply pipe 11), whereby the auxiliary hydraulic pumps 5A, 5B or the auxiliary hydraulic pump 5 are driven to rotate. While the concrete mixer truck V is stopped, agitation of the fresh concrete in the mixer drum M is performed by the auxiliary hydraulic pumps 5A, 5B or the auxiliary hydraulic pump 5, which are driven by the direct current motors 6A, 6B, instead of the engine E, and therefore the auxiliary hydraulic pumps 5, 5A, 5B may be pumps having a small capacity sufficient for the comparatively low speed agitation rotation. Hence, the direct current motors 6A, 6B may also be small, enabling a reduction in the size of the auxiliary hydraulic apparatus SD. Furthermore, a maximum current value supplied to the direct current motors 6A, 6B from the power supply Bat can be suppressed, and therefore the life of the power supply Bat can be lengthened and the capacity of the power supply Bat can be reduced.

In the first to third embodiments, the plurality of direct current motors 6A, 6B are operated selectively in accordance with the load of the mixer drum M, and therefore the maximum current value supplied from the power supply Bat to the direct current motors 6A, 6B can be reduced in accordance with the load of the mixer drum M. Hence, the life of the power supply Bat can be lengthened further, enabling a further reduction in the capacity of the power supply Bat. Moreover, small direct current motors 6A, 6B can be employed, enabling a reduction in cost.

In the first to third embodiments, the number of used direct current motors 6A, 6B is varied in accordance with the load of the mixer drum M, and therefore the discharge amount of the working oil discharged from the auxiliary hydraulic pumps 5A, 5B or the auxiliary hydraulic pump 5 to the supply pipe 11 can be secured within a predetermined range. As a result, variation in the agitation rotation speed of the mixer drum M can be suppressed.

In the first to third embodiments, the load of the mixer drum M is detected by detecting the pressure of the working oil in the supply pipe 11 (the working oil discharge pressure of the auxiliary hydraulic pump) using the pressure sensor 17, and therefore the number of direct current motors 6A, 6B operated in accordance with the load of the mixer drum M can be modified automatically. Further, since it is only necessary to determine whether or not to operate the pressure sensor 17, control is simple.

In the first and third embodiments, the auxiliary hydraulic apparatus SD includes the two auxiliary hydraulic pumps 5A, 5B, and the auxiliary hydraulic pumps 5A, 5B are connected respectively to the corresponding direct current motors 6A, 6B. If necessary, therefore, combinations of auxiliary hydraulic pumps 5A, 5B having different discharge capacities can be employed. Motors having suitable rated outputs for the auxiliary hydraulic pumps 5A, 5B are employed as the direct current motors 6A, 6B that drive the auxiliary hydraulic pumps 5A, 5B.

In the second embodiment, the auxiliary hydraulic apparatus SD includes the single auxiliary hydraulic pump 5, and the two direct current motors 6A, 6B are connected to the auxiliary hydraulic pump 5. As a result, the auxiliary hydraulic apparatus SD can be reduced in size, enabling a reduction in cost. Furthermore, the rated outputs of the used direct current motors 6A, 6B can be selected in response to variation in a load condition applied to the auxiliary hydraulic pump 5.

In the first and second embodiments, the switch valve 20 is provided in the loop-shaped pipe 8 of the mixer drum driving apparatus S, the check valve 13 is provided in the supply pipe 11 of the auxiliary hydraulic apparatus SD, and the opening/closing valve 15 is provided in the discharge pipe 12 of the auxiliary hydraulic apparatus SD. Using the switch valve 20, the check valve 13, and the opening/closing valve 15, the hydraulic motor 3 can be rotated by the hydraulic pump 4 while the engine E is operative, and the hydraulic motor 3 can be rotated by the auxiliary hydraulic pumps 5A, 5B or the auxiliary hydraulic pump 5 while the engine E is stopped. It should be noted that a similar effect can be obtained when the direction switching valve 21 of the third embodiment is used in place of the check valve 13 and the opening/closing valve 15.

Embodiments of the present invention were described above, but the above embodiments are merely examples of applications of the present invention, and the technical scope of the present invention is not limited to the specific configurations of the above embodiments.

In the auxiliary hydraulic apparatus SD described in the first and third embodiments, the two auxiliary hydraulic pumps 5A, 5B are driven by the two direct current motors 6A, 6B. Also in the auxiliary hydraulic apparatus SD described in the second embodiment, the single auxiliary hydraulic pump 5 is driven by the two direct current motors 6A, 6B. However, the number of direct current motors is not limited to two, and three or more direct current motors, for example, may be used. Further, a plurality of direct current motors having respectively different rated outputs may be used separately in accordance with the load of the mixer drum M.

In the first to third embodiments, the pressure of the working oil in the supply pipe 11 (the working oil discharge pressure of the auxiliary hydraulic pump) is detected in order to detect the rotation load of the mixer drum M. However, the rotation load of the mixer drum M may be detected on the basis of the respective rotation speeds of the mixer drum M, the auxiliary hydraulic pumps 5, 5A, 5B, and the direct current motors 6A, 6B.

In the first to third embodiments, the rotation mode of the mixer drum M is set on the basis of the selection position of the selection lever 14, but may be set using an operation button, a selection switch, or the like, for example, instead of the selection lever 14.

In the first to third embodiments, the mixer drum driving apparatus S uses working oil as the working fluid, but may use water, a water-soluble replacement fluid, or the like instead of working oil.

This application claims priority based on Japanese Patent Application No. 2012-65745, filed with the Japan Patent Office on Mar. 22, 2012, the entire contents of which are incorporated into this specification by reference.

The invention claimed is:

1. A mixer drum driving apparatus, comprising:
a mixer drum carried on a frame of a concrete mixer truck to be free to rotate;
a fluid pressure motor that drives the mixer drum to rotate;
a fluid pressure pump that is driven by power from an engine of the concrete mixer truck in order to supply a working fluid to the fluid pressure motor;
at least one auxiliary fluid pressure pump that is provided independently of the fluid pressure pump and is capable of supplying the working fluid to the fluid pressure motor so as to cause the mixer drum to perform agitation rotation;
a plurality of motors configured to drive the at least one auxiliary fluid pressure pump to rotate;
a control unit that controls rotation of the mixer drum, wherein, when the engine is stopped during the agitation rotation of the mixer drum, the control unit drives the at least one auxiliary fluid pressure pump to rotate by operating the plurality of motors selectively so that an agitation rotation speed of the mixer drum comes to be a predetermined speed,
wherein, a load of the mixer drum is detected by detecting a pressure of the working fluid discharged from the at least one auxiliary fluid pressure pump, and
wherein, the control unit controls a number of the motors selectively driving the at least one auxiliary fluid pressure pump to rotate in accordance with the load of the mixer drum; and
a pressure sensor for detecting the pressure of the working fluid discharged from the at least one auxiliary fluid pressure pump to detect the load of the mixer drum.

2. The mixer drum driving apparatus as defined in claim 1, wherein the at least one auxiliary fluid pressure pump includes a plurality of auxiliary fluid pressure pumps, and the motors are each connected to a corresponding one of the auxiliary fluid pressure pumps.

3. The mixer drum driving apparatus as defined in claim 1, wherein the at least one auxiliary fluid pressure pump is provided singly, and the plurality of motors are connected to the auxiliary fluid pressure pump.

4. The mixer drum driving apparatus as defined in claim 1, further comprising:
a connecting pipe that connects the fluid pressure pump to the fluid pressure motor;
a switch valve that is provided in the connecting pipe and blocks the connection between the fluid pressure pump and the fluid pressure motor when the engine is stopped;
a supply pipe configured to supply the working fluid discharged from the at least one auxiliary fluid pressure pump to the fluid pressure motor through the connecting pipe;
a check valve that allows the working fluid to flow only from the at least one auxiliary fluid pressure pump to the connecting pipe;
a discharge pipe configured to discharge a part of the working fluid, that is discharged into the connecting pipe from the fluid pressure motor, to a tank; and
an opening/closing valve configured to open and close the discharge pipe.

5. The mixer drum driving apparatus as defined in claim 4, wherein, when the engine is stopped, the switch valve is switched from an open position to a blocking position and the opening/closing valve is switched from a blocking position to an open position, and
the fluid pressure motor is driven to rotate by working fluid supplied from the at least one auxiliary fluid pressure pump, which is driven by the selectively operated motors, via the check valve.

6. The mixer drum driving apparatus as defined in claim 5, wherein, when the engine is restarted after being stopped, the switch valve is switched from the blocking position to the open position and the opening/closing valve is switched from the open position to the blocking position, and
the fluid pressure motor is driven to rotate by the working fluid discharged from the fluid pressure pump driven by the engine.

7. The mixer drum driving apparatus as defined in claim 1, further comprising:
a connecting pipe that connects the fluid pressure pump to the fluid pressure motor;
a switch valve that is provided in the connecting pipe and blocks the connection between the fluid pressure pump and the fluid pressure motor when the engine is stopped;
a supply pipe configured to supply the working fluid discharged from the at least one auxiliary fluid pressure pump to the fluid pressure motor through the connecting pipe;
a discharge pipe configured to discharge a part of the working fluid, that is discharged into the connecting pipe from the fluid pressure motor, to a tank; and
a control valve configured to control a communication condition between the supply pipe and the connecting pipe and a communication condition between the discharge pipe and the connecting pipe.

8. The mixer drum driving apparatus as defined in claim 7, wherein, when the engine is stopped, the switch valve is switched from an open position to a blocking position and the control valve is switched from a blocking position to an open position, and
the fluid pressure motor is driven to rotate by working fluid supplied from the at least one auxiliary fluid pressure pump, which is driven by the selectively operated motors, via the control valve.

9. The mixer drum driving apparatus as defined in claim 8, wherein, when the engine is restarted after being stopped, the switch valve is switched from the blocking position to the open position and the control valve is switched from the open position to the blocking position, and
the fluid pressure motor is driven to rotate by the working fluid discharged from the fluid pressure pump driven by the engine.

* * * * *